US007277384B1

(12) United States Patent
Chan et al.

(10) Patent No.: US 7,277,384 B1
(45) Date of Patent: Oct. 2, 2007

(54) PROGRAM AND METHOD FOR PREVENTING OVERLOAD IN A PACKET TELEPHONY GATEWAY

(75) Inventors: Kam Chan, San Jose, CA (US); Mathew Lodge, San Jose, CA (US); Shoou Jiah Yiu, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/544,196

(22) Filed: Apr. 6, 2000

(51) Int. Cl.
*G01R 31/08* (2006.01)
(52) U.S. Cl. ........................ 370/230; 370/235; 709/225
(58) Field of Classification Search ........ 370/229–230, 370/235, 237, 231, 236
See application file for complete search history.

(56) References Cited

U.S. PATENT DOCUMENTS

| 5,341,366 | A | 8/1994 | Soumiya et al. ............... 370/17 |
| 5,357,507 | A | 10/1994 | Hughes et al. ................. 370/60 |
| 5,583,857 | A | 12/1996 | Soumiya et al. ............. 370/233 |
| 5,592,672 | A * | 1/1997 | Grewal et al. ............... 718/105 |
| 5,751,691 | A | 5/1998 | Soumiya et al. ............... 370/17 |
| 5,812,526 | A | 9/1998 | Chang et al. ................ 370/230 |
| 5,826,169 | A | 10/1998 | Natarajan ................... 455/13.1 |
| 5,838,906 | A | 11/1998 | Doyle et al. ........... 395/200.32 |
| 5,862,126 | A | 1/1999 | Shah et al. .................. 370/230 |
| 5,872,771 | A | 2/1999 | Park et al. ................... 370/252 |
| 5,881,049 | A | 3/1999 | Beshai et al. ................ 370/230 |
| 5,886,980 | A | 3/1999 | Zheng ......................... 370/230 |
| 5,894,471 | A | 4/1999 | Miyagi et al. ............... 370/230 |
| 5,917,804 | A | 6/1999 | Shah et al. .................. 370/230 |
| 5,970,064 | A | 10/1999 | Clark et al. .................. 370/351 |
| 5,982,748 | A | 11/1999 | Yin et al. ..................... 370/232 |
| 6,028,840 | A | 2/2000 | Worster ........................ 370/230 |
| 6,046,981 | A | 4/2000 | Ramamurthy et al. ....... 370/232 |
| 6,067,287 | A | 5/2000 | Chung-Ju et al. ........... 370/232 |
| 6,075,770 | A | 6/2000 | Chang et al. ................ 370/230 |
| 6,091,706 | A * | 7/2000 | Shaffer et al. ............... 370/229 |
| 6,141,322 | A | 10/2000 | Poretsky ...................... 370/231 |
| 6,212,163 | B1 | 4/2001 | Aida ............................ 370/230 |
| 6,215,768 | B1 | 4/2001 | Kim ............................ 370/230 |
| 6,266,322 | B1 | 7/2001 | Berger et al. ................ 370/229 |

(Continued)

OTHER PUBLICATIONS

Harry Newton, Newton's Telecom Dictionary, Jan. 1998, Telecom Books and Flatiron, 13th edition, p. 436.*
Bijan Jabbari and David McDysan, "Performance of Demand Assignment TDMA and Multicarrier TDMA Satellite Networks", IEEE Journal on Selected Areas in Communications, vol. 10, No. 2, Feb. 1992, pp. 478-486.

(Continued)

*Primary Examiner*—Doris H. To
*Assistant Examiner*—Ian N. Moore
(74) *Attorney, Agent, or Firm*—Mager Johnson & McCollom, P.C.

(57) ABSTRACT

A program and a method for a gateway are provided to deny incoming calls to prevent overload. The program provides a maximum CPU utilization threshold CPUT, which is set by the user. When a new incoming call is presented to the packet telephony gateway, the program checks a present CPU utilization CPUP. If the present CPU utilization CPUP is greater than the threshold, the call is refused. This insures that sound quality of the calls currently being handled is maintained, and that existing calls are never dropped.

19 Claims, 2 Drawing Sheets

U.S. PATENT DOCUMENTS

| | | |
|---|---|---|
| 6,292,466 B1 | 9/2001 | Droz .......................... 370/232 |
| 6,314,085 B1 | 11/2001 | Saranka ...................... 370/230 |
| 6,330,226 B1 | 12/2001 | Chapman et al. ........... 370/232 |
| 6,400,685 B1 | 6/2002 | Park ........................... 370/232 |
| 6,411,601 B1 * | 6/2002 | Shaffer et al. .............. 370/230 |
| 6,418,148 B1 | 7/2002 | Kumar et al. ............... 370/468 |
| 6,442,138 B1 | 8/2002 | Yin et al. .................... 370/232 |
| 6,459,681 B1 | 10/2002 | Oliva ......................... 370/232 |
| 6,487,170 B1 | 11/2002 | Chen et al. ................. 370/231 |
| 6,490,249 B1 | 12/2002 | Aboul-Magd et al. ...... 370/232 |
| 6,529,499 B1 | 3/2003 | Doshi et al. ................ 370/352 |
| 6,570,855 B1 * | 5/2003 | Kung et al. ................. 370/237 |
| 6,578,077 B1 | 6/2003 | Rakoshitz et al. .......... 709/224 |
| 6,608,815 B1 | 8/2003 | Huang et al. ............... 370/232 |
| 6,625,155 B1 | 9/2003 | Dziong ...................... 370/395.2 |
| 6,650,643 B1 * | 11/2003 | Dobson ...................... 370/229 |
| 6,711,129 B1 * | 3/2004 | Bauer et al. ................ 370/230 |
| 6,795,867 B1 * | 9/2004 | Ma et al. .................... 709/240 |

OTHER PUBLICATIONS

Juha Heinanen, "Multiprotocol Encapsulation over ATM Adaptation Layer 5", Network Working Group Request for Comments: 1483 Telecom Finland, Jul. 1993, pp. 1-16.

"ATM Trunking Using AAL2 for Narrowband Services", The ATM Forum Technical Committee AF-VTOA-0113.000, Feb. 1999, pp. 1-52.

"Series I: Integrated Services Digital Network", International Telecommunication Union ITU-T Recommendation I.363.2, Sep. 1997, pp. 1-41.

"Series I: Integrated Services Digital Network", International Telecommunication Union ITU-T Recommendation I.366.2, Feb. 1999, pp. 1-86.

* cited by examiner

PROGRAM AND METHOD FOR PREVENTING OVERLOAD IN A PACKET TELEPHONY GATEWAY

BACKGROUND OF THE INVENTION

1. Field of the Invention

The present invention is related to the field of packet telephony, and more specifically to software and a method for preventing overload in a packet telephony gateway.

2. Description of the Related Art

In a packet telephony gateway, there are typically call-handling resources, such as telephony trunk interfaces and Digital Signal Processors (DSPs), and one or more Central Processing Units (CPUs). Each incoming call that the telephony gateway accepts consumes call-handling resources of the system. In addition, it generates data traffic that must be handed by the CPU or CPUs.

The prior art has correctly discerned that a packet telephony gateway is unable to process new calls when all call-handling resources are exhausted. Accordingly there are methods for handling the case where the call-handling resources are exhausted.

However, it is also possible that a central processing unit will reach maximum utilization before other call-handling resources are exhausted. When this happens, the CPU or CPUs cannot process all of the data packets in a timely manner. Accordingly, the CPU will start to ignore ("drop") those packets that it cannot process. Dropping of these packets degrades the sound quality of all the calls being handed by the packet telephony gateway.

In extreme cases, a CPU may be so overloaded that it cannot complete signaling processes that are time-sensitive to the external Public Switched Telephone Network (PSTN). This causes the PSTN device to which it is connected to drop or disconnect all calls.

Disconnected calls are a problem. At the very least, they generate customer dissatisfaction when billing is received. The situation of many disconnected calls also causes disruption in the operation of the PSTN, potentially causing faults in other PSTN equipment.

BRIEF SUMMARY OF THE INVENTION

The present invention overcomes these problems and limitations of the prior art.

Generally, the present invention provides a program and a method for a gateway to deny incoming calls to prevent overload. The program of the present invention provides a maximum CPU utilization threshold that is set by the user. When a new incoming call is presented to the packet telephony gateway, the program checks the present CPU utilization. If the present CPU utilization is greater than the threshold, the call is refused.

The method of the invention is to determine a suitable CPU utilization threshold, and set it in software. Then the gateway waits for a new incoming call. When one is received, the present CPU utilization is checked against the threshold. If it exceeds the threshold, the call is refused.

This ensures that sound quality of the calls currently being handled is maintained, and that existing calls are never dropped. The foregoing and other objects, features and advantages of the invention will become more readily apparent from the following detailed description of a preferred embodiment, which proceeds with reference to the drawings.

DETAILED DESCRIPTION OF THE PREFERRED EMBODIMENT(S)

Figure 1:
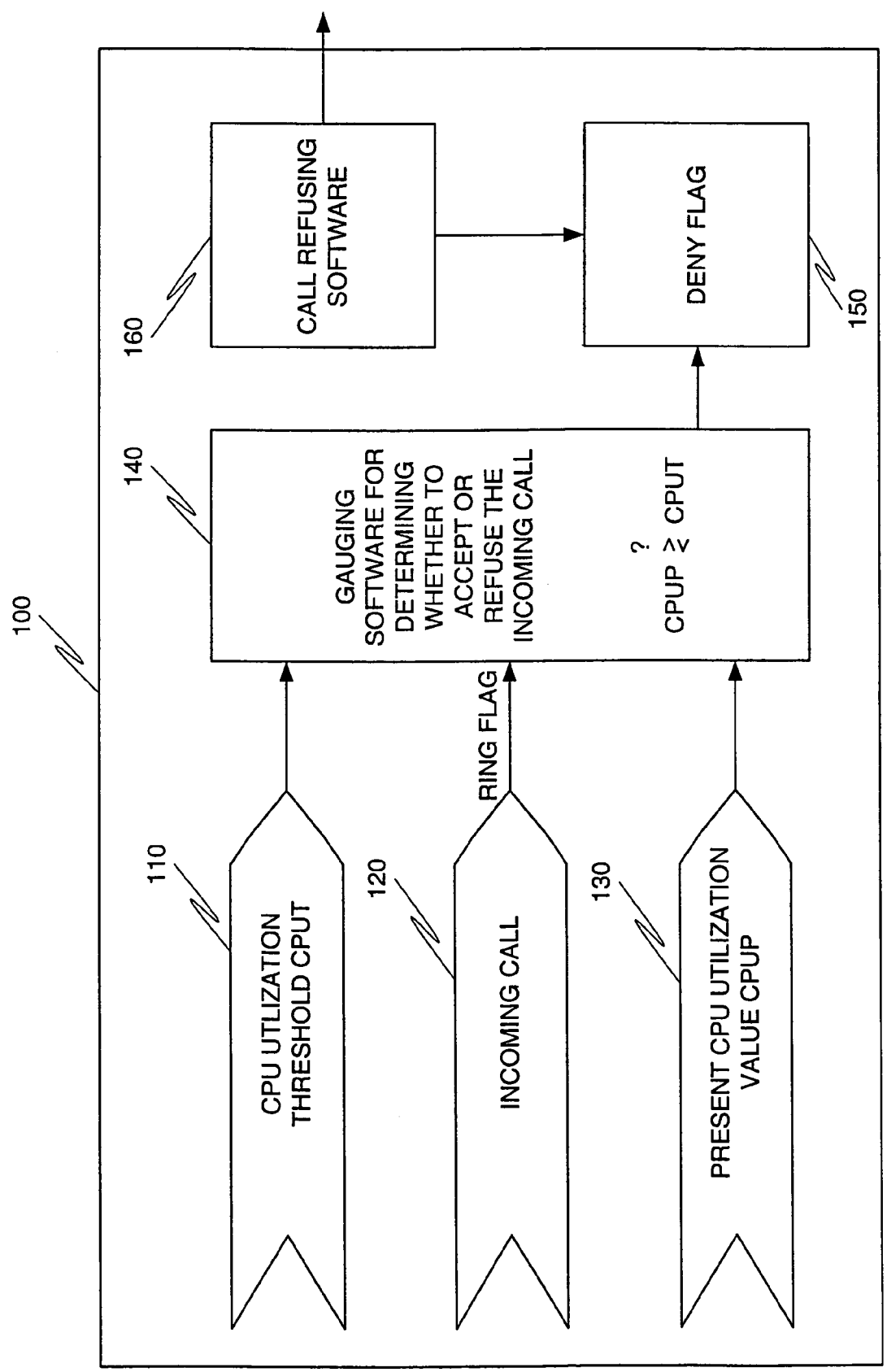
FIG. 1 is a functional block diagram of a program made according to the present invention.

As has been mentioned, the present invention provides a program and a method for a gateway to deny incoming calls to prevent a CPU overload. A gateway can be a router or similar network device that is controllable also by a program, such as a computer program.

Regarding the program, the detailed descriptions which follow are presented largely in terms of display images, algorithms, and symbolic representations of operations of data bits within a memory, such as a computer memory or other memory associated with the gateway. These algorithmic descriptions and representations are the means used by those skilled in the data processing arts to most effectively convey the substance of their work to others skilled in the art. Often, for the sake of convenience only, it is preferred to implement and describe a program as various interconnected distinct software modules or features. This is not necessary, however, and there may be cases where various softwares are equivalently aggregated into a single program with unclear boundaries.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers, network devices such as gateways, or other similar devices. In all cases, there should be borne in mind the distinction between the method operations of operating a network device, and the method of computation itself. The present invention relates to method steps for operating a network device, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not necessarily inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that the program of the invention need not reside in a single memory, or even a single machine. Various portions, modules or features of it can reside in any combination of computer readable media, such as separate memories, of even separate machines. The separate machines may be connected directly, or through a network, such as a local access network (LAN), or a global network, such as what is presently known as Internet-1. Similarly, the users need not be collocated with each other, but each only with a machine that houses a portion of the program.

Referring now to FIG. 1, a program 100 made according to the invention is described in detail. Program 100 prevents overload in a packet telephony gateway, such as a router, etc.

The program 100 includes a CPU utilization threshold CPUT input 110. Preferably a user can store this input 110 in a memory, by issuing a command. The memory can be a memory of the gateway, or a related memory. The memory is preferably non-volatile memory, such as NVRAM. The input 100 preferably includes a numerical value, such as a percentage. Alternately it can include one of a plurality of pre-designated levels. Each level in turn can specify a percentage. A preferred value for CPUT is 70% utilization of a CPU or bank of aggregated CPUs of the gateway.

The program 100 also includes an incoming call input 120. The incoming call input 120 denotes when a new incoming telephone call is received by the gateway. The incoming call input 120 can operate in any way known in the art. For example, it can be an interrupt or it can generate an interrupt. Alternately, the incoming call input can set a ring flag when a new incoming telephone call is received (i.e. when the telephone line is "ringing"), but before the incoming call is answered.

The program 100 additionally includes a present CPU utilization value CPUP input 130. This includes a present value that is an indicator of how much the CPU or bank of CPUs are being used at the moment. The value of CPUP can be a number, preferably a percentage. Alternately it can include one of a plurality of pre-designated levels. Each level in turn can specify a percentage.

It will be appreciated that the input 130 can be implemented by any number of ways. For example, the value of CPUP can be updated regularly, once every cycle of the program. Alternately, it can be estimated when it is determined that an incoming call has been received. For example, the present CPU utilization value input 130 can be updated when the ring flag is set.

The program 100 moreover includes a gauging software 140. The gauging software 140 is for determining, when a new incoming telephone call is denoted as being received, whether a number aspect of the CPUP is larger than a number aspect of the CPUT, and if so for setting a deny flag 150. The deny flag 150 can be a signal, an interrupt, or a value of a variable stored in a memory or other equivalent way. Setting the deny flag 150 means that the CPUs of the gateway are too busy, and will refuse the incoming telephone call.

The program 100 further includes a call refusing software 160. The refusing software 160 is for the packet telephony gateway to refuse the incoming call if the deny flag 150 is set.

The program 100 of the invention can be a standalone program, or a part, such as a subroutine of a larger program. The person of ordinary skill in the art will determine the most suitable implementation.

Figure 2:
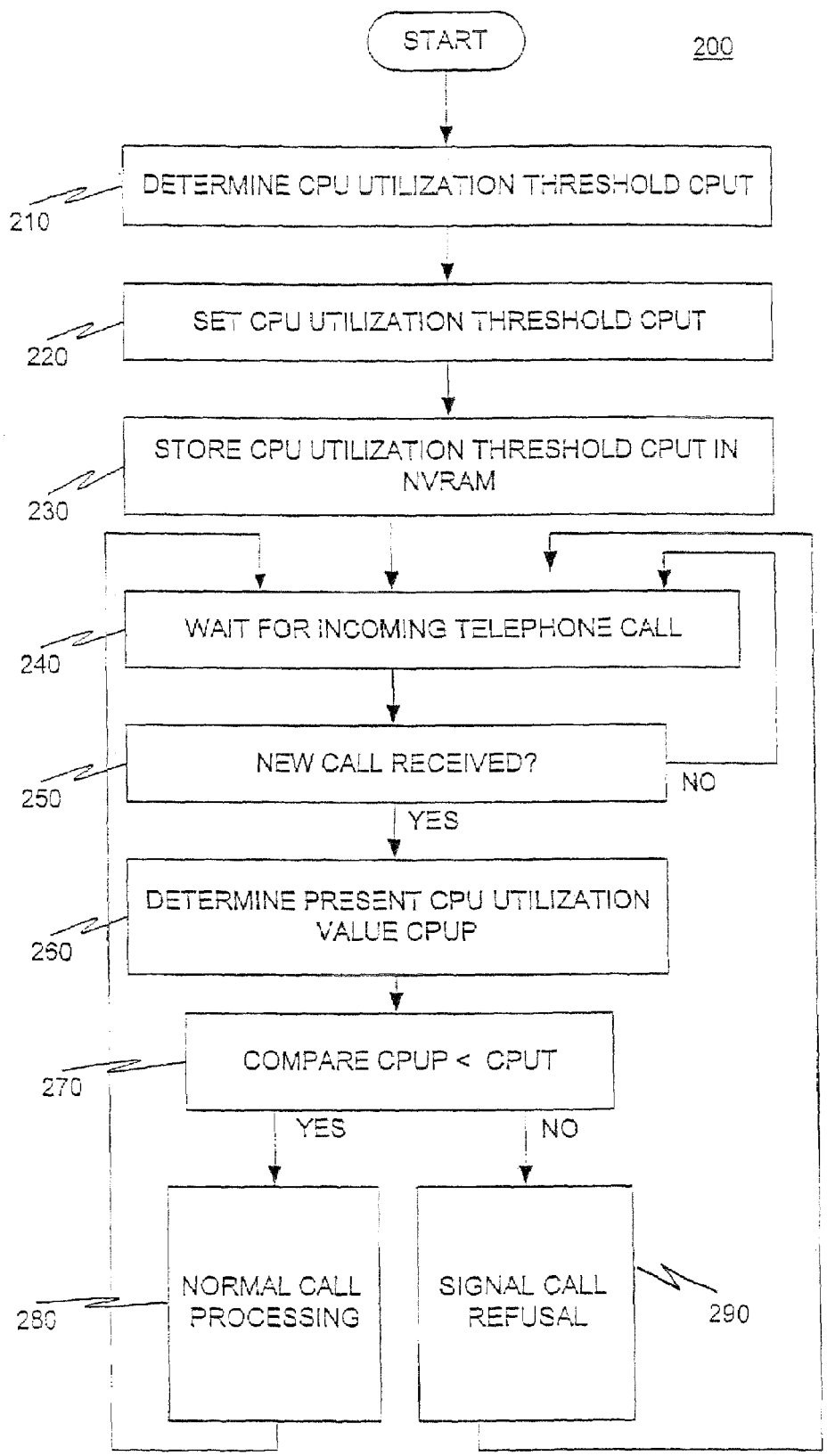
FIG. 2 is a flowchart illustrating a method according to the invention.

Referring now to FIG. 2, a method of the invention is described with the assistance of flowchart 200.

According to a box 210, the desired CPU utilization threshold CPUT of a CPU of the gateway is determined. Equivalently, CPUT can be the threshold of a bank of CPUs, taken as an average or as a cooperating statistic. Preferably the threshold is expressed as a percentage, such as 70%. Higher values will permit more calls to be handled, but with higher voice degradation during peak demand periods. Lower values will permit better sound quality for all the calls.

According to a box 220, the CPU utilization threshold CPUT determined in box 210 is set. Setting can be performed in many ways. Preferably, setting is performed by a user issuing a setting command in software. Preferably, according to an optional box 230, an aspect of the setting command is stored in NVRAM. The aspect can be just the number of the percentage.

According to two cooperating boxes 240 and 250, the program waits for an incoming telephone call. This can be in any number of ways. As a first example, an incoming telephone call can generate an interrupt. As a second example, box 240 sets a waiting time period, and box 250 checks if an incoming telephone call has been received within the last waiting time period. In this implementation, other operations may be happening during the time period of box 240, such as updating a present CPU utilization value, which happens anyway by operation of the box 260 (explained below).

According to a box 260, a present CPU utilization value CPUP is determined. It can be determined by being computed either after a call is registered, that is after boxes 240 and 250. Alternately, the present CPU utilization value CPUP can be input by consulting the latest of regularly updated values. It the preferred embodiment, ultimately accepting the incoming call will increase the CPUP.

According to a box 270, when an incoming telephone call is received, the determined present CPU utilization value (CPUP) is compared with the entered and set CPU utilization threshold (CPUT).

If the determined present CPU utilization value is found to be less than the entered and set CPU utilization threshold, then according to a box 280, the incoming call is processed normally, and execution returns to box 240.

But if the determined present CPU utilization value is found to be greater than the entered and set CPU utilization threshold, then according to a box 290, the incoming call is refused. This can be accomplished by administering a busy signal.

The comparison of step 270 allows as a design choice of what happens if the determined present CPU utilization value is found to be greater than the entered and set CPU utilization threshold. The choice of whether the call will be refused or not does not impact the invention—it can be merely a matter of how the threshold was defined in the first place.

The call handling mechanism of the program of the invention ensures that the sound quality of all calls is maintained, and that existing calls are not dropped due to CPU overload, by refusing to accept new calls that would cause the central processing unit to be overloaded.

A person of ordinary skill in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those of ordinary skill in the art in view of the present description that the invention can be modified in numerous ways. The inventor regards the subject matter of the invention to include all combinations and subcombinations of the various elements, features, functions and/or properties disclosed herein. For example, the boxes of the flowchart of FIG. 2 can be performed in a different order, and/or repeating. The operations of boxes 210 and 220 can be repeated at a later stage, such as after box 240, etc.

The following claims define certain combinations and subcombinations, which are regarded as novel and non-obvious. Additional claims for other combinations and subcombinations of features, functions, elements and/or properties may be presented in this or a related document.

The invention claimed is:

1. An apparatus comprising:
    a network gateway that includes a Central Processing Unit (CPU),
    means for storing a CPU utilization threshold value in said apparatus,
    means for receiving incoming calls, each incoming call requiring a particular set of resources including an amount of CPU utilization,
    means operable when an incoming call is received for calculating a present CPU utilization value, said present CPU utilization value being independent of the particular set of resources required by said incoming call,
    means operable when said incoming call is received for comparing said present CPU utilization value to said CPU utilization threshold, said comparison being independent of the particular set of resources required by said incoming call,
    means signaling refusal of said incoming call when said present CPU utilization value is above said present CPU utilization threshold value, said signaling refusal being done independent of the particular set of resources required by said incoming call.

2. A method comprising;
    establishing a Central Processing Unit (CPU) utilization threshold value for a CPU in a network gateway that receives incoming calls, each incoming call requiring a particular set of resources including an amount of CPU utilization,
    when an incoming call is received by said network gateway, taking the following steps independent of the particular set of resources required by said incoming call,
    calculating a present CPU utilization value,
    comparing said present CPU utilization value to said CPU utilization threshold value,
    signaling refusal of said incoming call when said CPU utilization value is above said said present CPU utilization threshold value value.

3. The method of claim 2 wherein said CPU utilization threshold value is set at a value significantly below a maximum CPU processing capacity of said CPU in order to insure that calls are handled with high voice quality during periods of peak CPU demand.

4. The method of claim 2 wherein said CPU utilization threshold value is set to a value equal to seventy percent of said maximum CPU processing capacity.

5. The method of claim 2 including setting a deny flag when said present CPU utilization value is above said CPU utilization threshold.

6. The method of claim 5 wherein incoming calls are refused without being answered when said deny flag is set.

7. The method of claim 2 wherein the value of said CPU utilization threshold value is stored in non-volatile random access memory (NVRAM).

8. The method of claim 2 including setting a ring flag when a new incoming call is received.

9. The method of claim 8 including calculating a new CPU utilization value when said ring flag is set.

10. The method of claim 2 wherein refusal of said incoming call is signaled by generating a busy signal.

11. The method of claim 2 wherein said gateway detects a ring signal of said incoming call and determines whether or not to refuse said incoming call prior to answering said incoming call.

12. An apparatus comprising,
    a network gateway that includes a plurality of resources including a Central Processing Unit (CPU), said network gateway being adapted to receive an incoming call from a caller, said incoming call requiring particular resources including a certain amount of CPU utilization,
    said network gateway having a settable CPU utilization threshold,
    said CPU being adapted to calculate a present CPU utilization value that indicates the present utilization of said CPU,
    a call deny flag that is set when said present CPU utilization value is above said utilization threshold, said deny flag being set independent of the particular resources required by said incoming call, and
    means for indicating refusal of said incoming call to said caller without answering said incoming call when said deny flag is set.

13. The apparatus of claim 12 wherein said CPU utilization threshold is set at a value significantly below a maximum CPU processing capacity of said CPU in order to insure that call are handled with high voice quality during periods of peak CPU demand.

14. The apparatus of claim 11 wherein said CPU utilization threshold is set to a value equal to seventy percent of said maximum CPU processing capacity.

15. The apparatus of claim 12 including setting a deny flag when said present CPU utilization value is above said CPU utilization threshold.

16. The apparatus of claim 15 wherein incoming calls are refused without being answered when said deny flag is set.

17. The apparatus of claim 12 wherein a value of said CPU utilization threshold is stored in non-volatile random access memory (NVRAM).

18. The apparatus of claim 12 including setting a ring flag when a new incoming call is received and including calculating a new CPU utilization value when said ring flag is set.

19. The apparatus of claim 12 wherein said gateway includes means for detecting the ring signal of said incoming call and determines whether or not to refuse said incoming call prior to answering said incoming call.

* * * * *